United States Patent
Sen et al.

(10) Patent No.: US 9,455,529 B2
(45) Date of Patent: Sep. 27, 2016

(54) PROXIMITY CAPACITIVE COUPLING FOR BOARD-TO-BOARD WIDE BANDWIDTH TRANSMISSIONS

(71) Applicant: Intel Corporation, Santa Clara, CA (US)

(72) Inventors: Shreyas Sen, Hillsboro, OR (US); Chintan S. Thakkar, Portland, OR (US); James E. Jaussi, Hillsboro, OR (US); Bryan K. Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 14/286,445

(22) Filed: May 23, 2014

(65) Prior Publication Data

US 2015/0340814 A1    Nov. 26, 2015

(51) Int. Cl.

| | |
|---|---|
| *H01R 12/00* | (2006.01) |
| *H01R 13/6461* | (2011.01) |
| *H01R 43/20* | (2006.01) |
| *H01R 13/6586* | (2011.01) |
| *H01R 13/6598* | (2011.01) |
| *H01R 13/652* | (2006.01) |
| *H01R 13/627* | (2006.01) |
| *G06F 3/044* | (2006.01) |
| *H01R 13/6464* | (2011.01) |
| *H01R 13/62* | (2006.01) |
| *H01R 13/66* | (2006.01) |

(52) U.S. Cl.
CPC .......... *H01R 13/6461* (2013.01); *G06F 3/044* (2013.01); *H01R 13/627* (2013.01); *H01R 13/6464* (2013.01); *H01R 13/652* (2013.01); *H01R 13/6586* (2013.01); *H01R 13/6598* (2013.01); *H01R 43/20* (2013.01); *G06F 2203/04108* (2013.01); *H01R 13/6205* (2013.01); *H01R 13/6625* (2013.01); *Y10T 29/435* (2015.01)

(58) Field of Classification Search
CPC .................................. H01R 13/6625
USPC ............................................ 439/950
See application file for complete search history.

(56) References Cited

U.S. PATENT DOCUMENTS 4,763,340 A * 8/1988 Yoneda .............. G06K 7/10326
340/870.37
5,073,761 A * 12/1991 Waterman ................. H01P 1/04
333/24 C (Continued)

OTHER PUBLICATIONS

"Proximity Communication", Creative Commons Attribution—ShareAlike License, Wikipedia, the free encyclopedia, modified on Jul. 25, 2012, p. 1. Available at: http://en.wikipedia.org/wiki/Proximity communication.

*Primary Examiner* — Tho D Ta
(74) *Attorney, Agent, or Firm* — International IP Law Group, P.L.L.C.

(57) ABSTRACT

Techniques for forming high-bandwidth proximity connection between capacitively coupled plug and receptacle are described herein. A system for achieving capacitive coupling between contactless pads is described. The techniques include aligning and retaining the plug and receptacle in close proximity to one another. The techniques include cancelling crosstalk in the system based on the symmetry and orientation of differential pairs comprising signal pads. The techniques include enabling a high-bandwidth proximity transmission by filtering the transmission using a silicon buffer component.

20 Claims, 14 Drawing Sheets

(56) References Cited

U.S. PATENT DOCUMENTS

| | | | | |
|---|---|---|---|---|
| 6,612,852 B1 * | 9/2003 | Panella | .................. | H01L 23/48 257/E23.01 |
| 7,252,565 B2 * | 8/2007 | Hunter | .................... | H01F 38/14 439/352 |
| 7,749,014 B2 * | 7/2010 | Chiang | .................. | H01L 23/32 439/331 |
| 9,004,925 B2 * | 4/2015 | Niitsu | .................. | H05K 1/0239 439/67 |
| 2013/0052873 A1 * | 2/2013 | Riezebos | ............... | H01R 13/35 439/620.21 |

* cited by examiner

200

200

200

300

300

400

400

400

500

600

700

PROXIMITY CAPACITIVE COUPLING FOR BOARD-TO-BOARD WIDE BANDWIDTH TRANSMISSIONS

TECHNICAL FIELD

This disclosure relates generally to capacitive coupling between a plug and a receptacle, or generally between two flat surfaces in close proximity. More specifically, the disclosure describes a system that enables wide bandwidth transmission between contactless pads that are capacitively coupled.

BACKGROUND

A wide range of computing devices rely on high-bandwidth connectors. Such high-bandwidth connectors facilitate a connection between a plug of a cable, e.g., a cable from a computing device, and a receptacle, e.g., a receptacle in another computing device. Most high-bandwidth connectors are for small form factor platforms, e.g., phones and tablets, which require a relatively small area consumed by the depth of a receptacle. Moreover, most electric connectors in the marketplace have limits on the number of mating cycles due to repeated contact that results in worn pads.

DETAILED DESCRIPTION

Figure 1A:
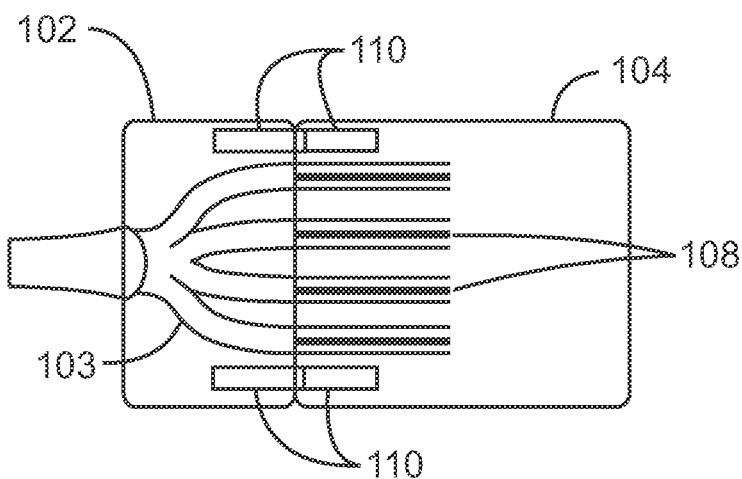
FIG. 1A is a schematic illustrating an example plug head and receptacle that are capacitively coupled.

Connectors and couplings for computer devices may use, for example, inductive coupling, or coupled transmission lines. Inductive coupling can support only very low bandwidth transmission for high (mm range) communication distances. As the communication distance increases, the size of the inductor will need to increase, thereby reducing the self-resonance frequency of the inductor and making high-speed data transfer difficult, especially at low power. Moreover, coupled transmission lines utilize electromagnetic fields as opposed to the electric fields that rely on inductive and capacitive coupling. The electromagnetic field poses a problem as the separation distance increases in the coupled transmission lines, and the force of the magnetic field weakens at a lower rate than the force of the electric field. Significant crosstalk is created with both inductive coupling and coupled transmission lines, thus making it difficult to utilize for creating several parallel contactless channels. These transmission techniques are not as reliable and as scalable as a proximity-based, low-power, capacitively coupled configuration.

Typical capacitive coupling has had success at the micrometer scale, in chip-to-chip type communications. The techniques described herein enhance the scalability of, and increase the effective communication distance for capacitive coupling outside on a micrometer scale. In particular, the present techniques provide a board to board (mm scale) capacitive coupled link. The differential design includes automatic near neighbor crosstalk cancellation, which enables a scalable bandwidth for each design using parallel channels. Moreover, each design can use zero depth or finite depth for a higher bandwidth. In this manner, a low cost, high bandwidth connector can be realized with no limit on mating cycle. Additionally, filtering and integration can be included with reset functionality to provide efficient low-power signal processing. Although several examples of the present techniques refer to a plug and receptacle, the present techniques may be used with any proximity capacitive coupling.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present techniques. It will be apparent, however, to one skilled in the art that these specific details need not be employed to practice the present techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present techniques.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present techniques described herein.

The subject matter disclosed herein relates to techniques for forming a contactless capacitive coupling between a plug and a receptacle at millimeter scale distances. Thus, the current techniques are concerned more with board-to-board communication with contact proximities in the millimeters, than chip-to-chip communication with contact proximities in the micrometers. Proximity couplings based on capacitance can be utilized to enable high-bandwidth transmissions, thereby mitigating crosstalk due to higher self-resonance frequencies at low power. A differential coupler configuration is described that enables complete crosstalk cancellation for near neighbors.

While inductive coupling and coupled transmission lines produce excessive crosstalk and are not similarly scalable in size, power, and effective distance, the disclosed capacitively coupled plug and receptacle system overcomes these issues. The techniques described herein include forming a proximity coupling between capacitively coupled contactless pads. An alignment mechanism can help stabilize and align the proximity coupling between a plug and a receptacle. The proximity coupling includes a capacitive coupling established at low power, but which maintains a relatively high self-resonance frequency. Capacitive coupling provides a high self-resonance frequency for the same communication distance, which is useful for high-bandwidth transmission, when a filter and integrator are utilized. A filtering and integration function can be configured as part of the coupler design that can effectively eliminates ringing from a self-resonance frequency resulting from the transmission.

The techniques described herein include capacitively coupling a computing device to another computing device, for example, or for capacitively coupling a computing device to a power source, or some other compatible device. The capacitive coupling is achieved at high frequency and using low power, while enabling high-bandwidth transmission to and from a computing device. Traditional communication couplings must come into physical contact with one another in order to electrically transmit data. Conventional high-speed PC cables and connectors (e.g., universal serial bus (USB), Thunderbolt) operate this way. These cables and connectors begin to wear over time, limiting the number of connector insertions before the connectors begin to fail. However, the high-bandwidth transmission described herein is achieved without physical contact between contactless pads. Thus, the problem of wear is altogether eliminated.

A "capacitive coupling," as described herein, is the transfer of electrical energy by means of the capacitance between, for example, two circuit nodes, or between two contactless pads, or more generally between a plug and a receptacle. It will be understood that the two contactless pads or the plug and the receptacle are not required to be in direct physical contact with one another in order for the proximity coupling described herein to enable high-bandwidth transmission.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1A is a schematic illustrating an example plug head and receptacle that are capacitively coupled. A plug head 102 is at the end of a cable 103, and the cable 103 can be from a computing device, a power source, or any other compatible device or source. A receptacle 104 is configured to accept an inserted plug head 102 through a stabilized, contactless connection. The plug head 102 and receptacle 104 are shown to have a zero insertion depth, and are thus the couplers on each end are vertically mounted. The receptacle 104 may include a printed circuit board. In some cases, the printed circuit board may be made of FR4 material. Unlike conventional high-bandwidth connections that wear due to friction between the components, the contactless pads do not physically touch when the receptacle 104 and plug 102 are mated, and the capacitive coupling does not suffer similar wear. A plurality of wires 106 stem from the cable 103 through the plug 102. Contactless pads (not illustrated) at the end of the traces 106 are capacitively coupled with contactless pads (not illustrated) at the end of printed circuit board (PCB) traces 108 within the receptacle 104. Also included in both the plug head 102 and the receptacle 104 are a set of power and ground contact pins 110. While the contactless pads do not physically touch, the power and ground pins 110 come into contact with one another to make a physical connection. As illustrated, any of the pins 110 could be defined as power or ground pins, according to the receptacle and plug design.

Figure 1B:
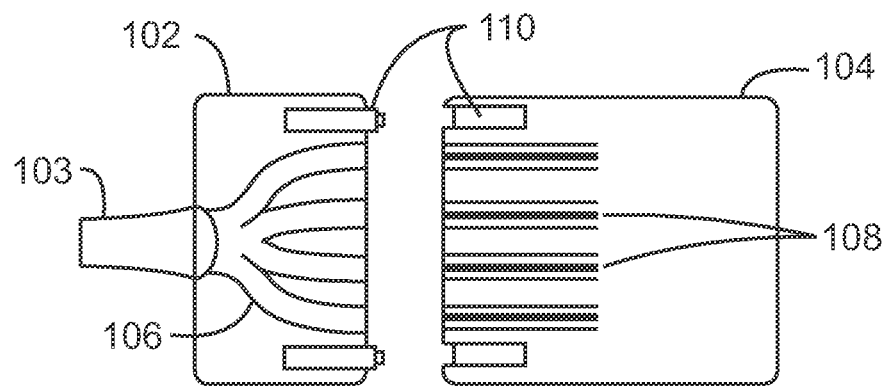
FIG. 1B is a schematic illustrating an example plug head and receptacle that are separated.

FIG. 1B is a schematic illustrating an example plug head and receptacle that are separated from one another. This figure incorporates the same description as that of FIG. 1A, but the plug 102 and receptacle 104 of FIG. 1B are not coupled to one another. The ground pins 110 are shown extruding from the plug 102. Ground pins 110 are also shown indented and receding within the receptacle 104. A space has been hollowed out in the receptacle 104 to allow the ground pins 110 to come into physical contact with one another when the plug 102 is properly aligned. When the plug 102 is properly aligned, an alignment and retention mechanism (not shown) can align and retain the proximity coupling made between the plug 102 and receptacle 104. This ensures that contactless pads from the plug 102 can communicate effectively at a proximate distance with the contactless pads from the receptacle 104.

Figure 2A:
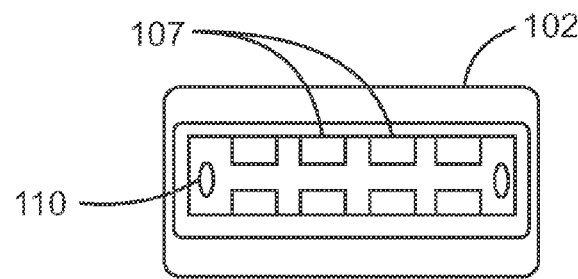
FIG. 2A is a front view of an example plug head from FIG. 1B.

FIG. 2A is a front view of an example plug head from FIG. 1B. It illustrates the contactless pads 107 and power or ground contact pins 110 along the front of the plug 102. The contactless pads 107 are configured to send and receive positive and negative polarity signals to and from counterpart contactless pads located on a receptacle (not shown).

Figure 2B:
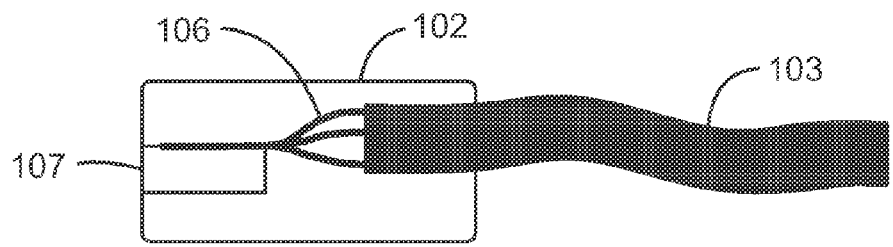
FIG. 2B is a side view of an example plug head from FIG. 1B.

FIG. 2B is a side view of an example plug head from FIG. 1B. It illustrates the traces 106 and how the cable 103 spreads, for example, through PCB lines or other electrical circuits, and is configured to make an electrical connection with each contactless pad 107.

Figure 2C:
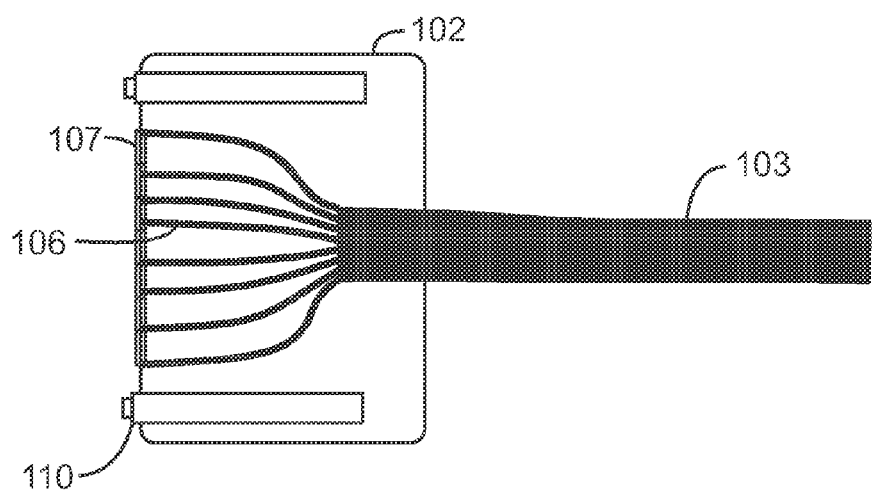
FIG. 2C is a view of an example plug head having a higher bandwidth cable and contactless pad that has a generally larger area.
Figure 4A:
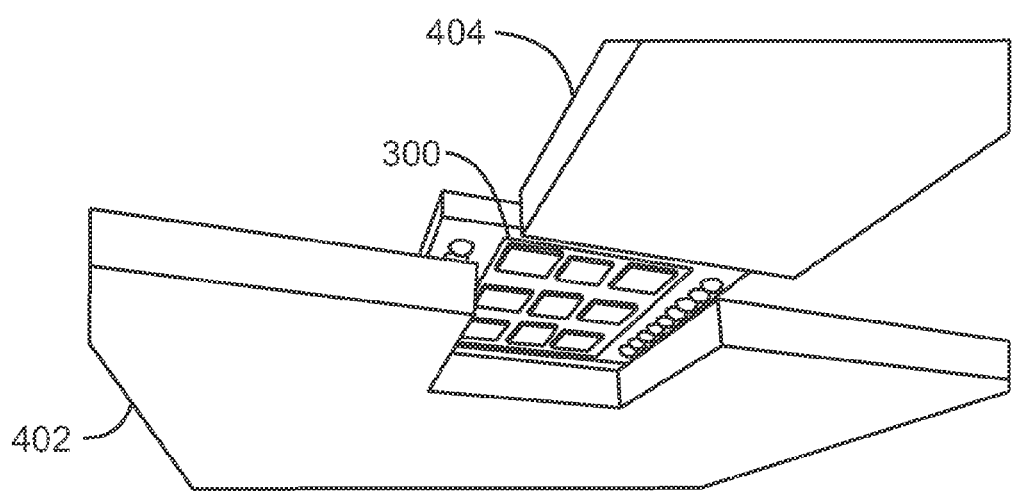
FIG. 4A is a perspective view of a connector-less printed circuit board communication for a high-density interconnect.
Figure 4B:
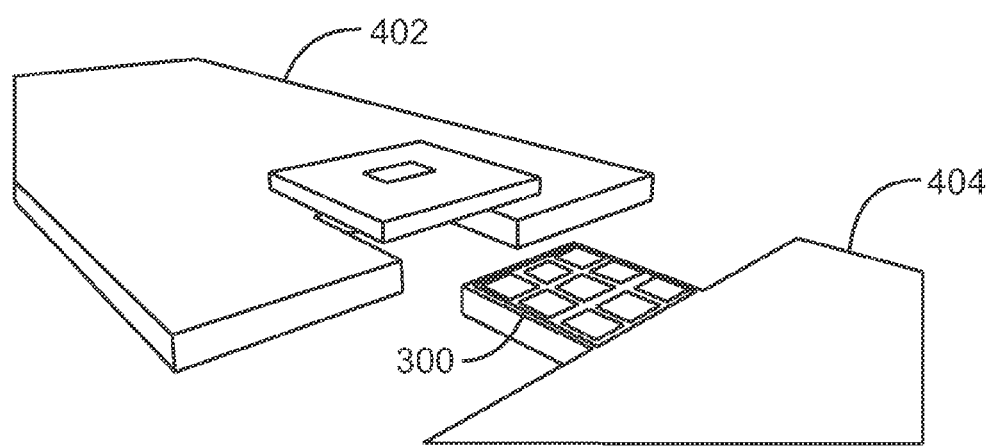
FIG. 4B is another perspective view of a connector-less printed circuit board communication for a high-density interconnect.

FIG. 2C is a view of an example plug head having a higher bandwidth cable and contactless pad that has a generally larger area. This plug 102 can be configured to be inserted into a receptacle (not shown) at some insertion depth of greater than zero. The couplers on the plug 102 and receptacle are horizontally mounted, allowing more area, and hence, more parallel channels for couplers to utilize. In other words, plug 102, which has an additional number of contactless pads (a larger array is used on the plug) in order to accommodate larger bandwidth, inserts into the receptacle. FIGS. 4A and 4B also illustrate a horizontal coupling between plug and receptacle, where the plug and receptacle are placed above and below one another, allowing for a larger transmission area with more parallel channels. In an embodiment, between the ground pins 110 there are contactless pads 107 surrounding the top of the plug 102 and the bottom of the receptacle (as well as the front of the plug and front of the receptacle) in order to achieve more efficient receptacle-to-plug mating and capacitive coupling. Additional traces 106 are shown originating from the cable 103 to achieve higher bandwidth transmission and to implement additional contactless pads 107 to achieve capacitive coupling.

Although FIGS. 2A, 2B, and 2C generally illustrate a system to capacitively couple a plug and a receptacle, the techniques described herein may be implemented in various types of computing devices, which can act as a receptacle, can act as transmitting through a plug into a receptacle, and can act as a receptacle and include a plug. Moreover, other types, sizes, and configurations of components of a computing device may be incorporated and may benefit from the capacitively coupled plug and receptacle design described herein. For example, a laptop device can be capacitively coupled using the techniques described herein to a docking station. As another example, another computing device, such as a phone, could be coupled using the techniques described herein to a laptop device, or to a charging mat, thus enabling wireless communication or wireless charging, respectfully, through capacitively coupled proximity transmissions.

Figure 3A:
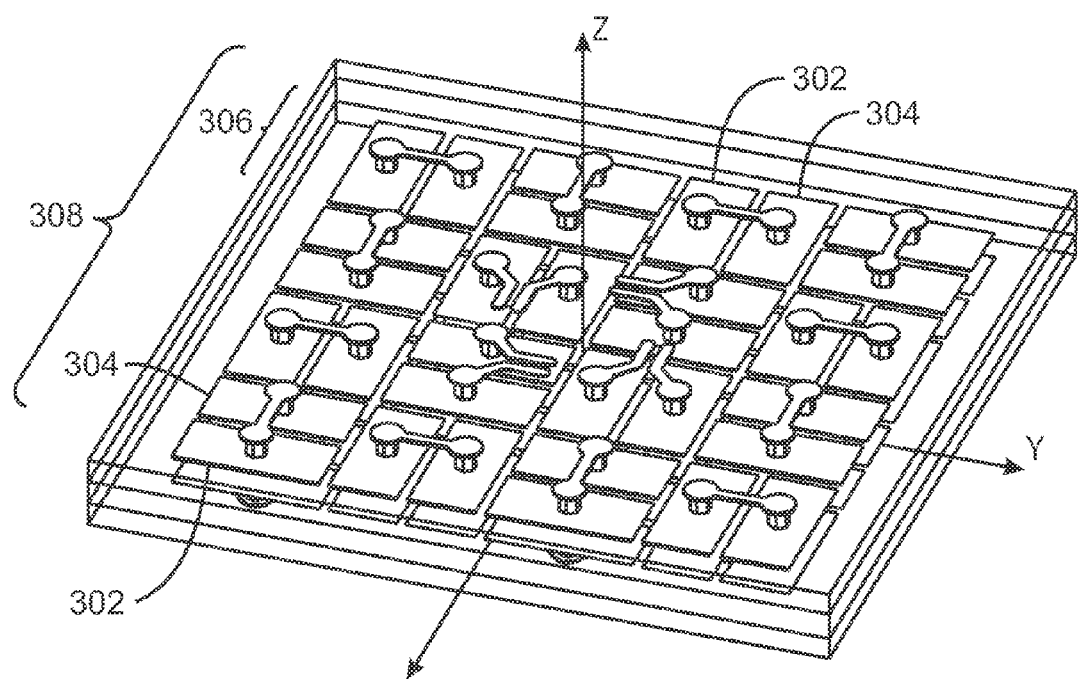
FIG. 3A is a three dimensional schematic diagram of an example proximity coupler design.

FIG. 3A is a three dimensional schematic diagram of an example proximity coupler design. The proximity coupler 300 is configured by multiple differential pairs, having a positive polarity signal 302 and a negative polarity signal 304. Differential pairs are typically used to eliminate common mode noise experienced in an electrical signal. Differential signaling is a method of transmitting information electrically with complimentary signals (i.e., a positive signal and a negative signal) sent on two paired wires, called a differential pair. The technique is effective at improving resistance to electromagnetic noise, including self-resonance frequencies exhibited during capacitive coupling.

Together the positive and negative polarities of the differential pair comprise a contactless pad 306 used to achieve the capacitive coupling for wide bandwidth proximity transmission described herein. The contactless pads are arranged in an array 308, to maximize the area of the proximity coupler 300, and thus support more bandwidth. It is noted that differential pairs along the perimeter of the array 308 are shown as shorted. These differential pairs act as dummy nodes in this implementation. However, this illustration is for exemplary purposes, and in some cases all of the differential pairs of array 308 are configured to transmit signals within a computing device.

The design of the contactless pad array 308 in FIG. 3A is scalable because of the 90-degree offset geometry that is illustrated by the differential pairs. These offsets are designed to address crosstalk cancellation. Crosstalk is a phenomenon by which a transmitted signal on a channel of a transmission system creates an undesired effect in another channel. Crosstalk can be caused, for example, by undesired capacitive, inductive, or conductive coupling.

In the contactless pad array 308 of FIG. 3A, as the number of parallel channels increases because the number of pads increases, the interference between the channels also increases, and this makes it difficult to increase the scale of channels. However, as mentioned, the design of the differential pairs in the contactless pads 306 acts to eliminate most of the interference, thus enabling high-bandwidth capacitive coupling at relatively low power levels. The alternating orientation of the positive polarity 302 and the negative polarity 304 nodes of a contactless pad 306 in the array of contactless pads 308 acts to effectively and automatically cancel out naturally occurring crosstalk. The cancellation of crosstalk based on the symmetry of the differential pairs is discussed in more detail with respect to FIG. 3C below, which illustrates how a contactless pad includes a differential pair configuration, and the contactless pads are arranged in an array with the contactless pads configured to enable crosstalk cancellation for near neighbors, or neighboring differential pairs adjacent to a particular differential pair in the array.

Figure 3B:
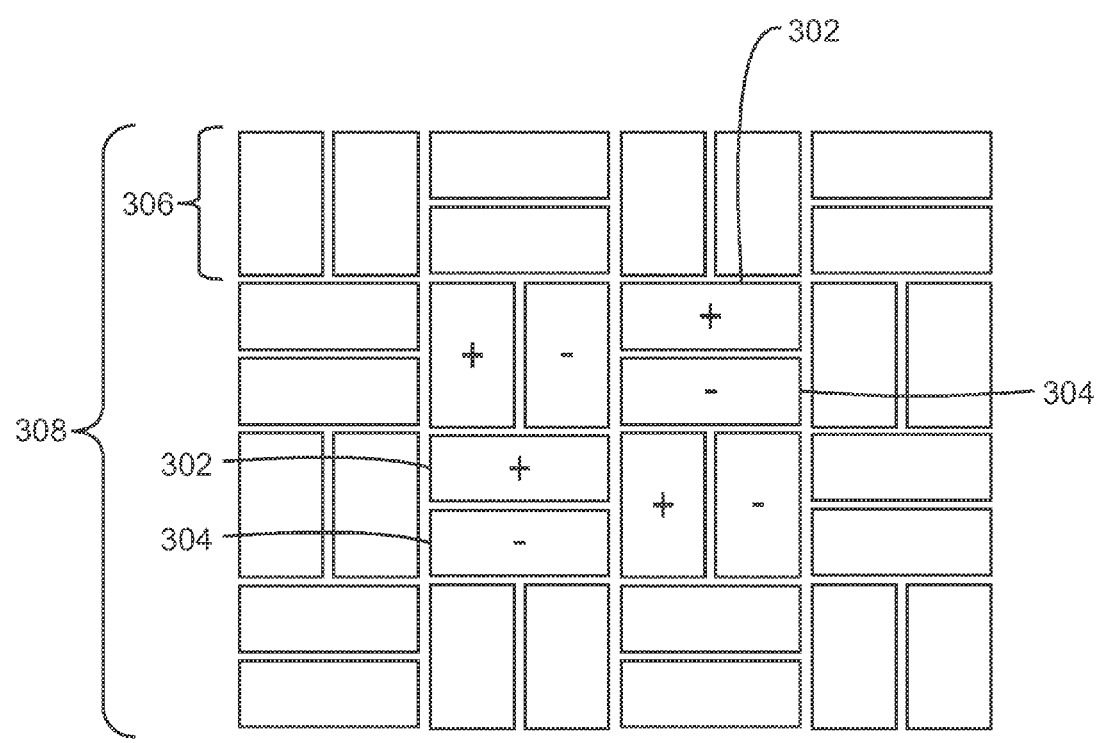
FIG. 3B is a top view block diagram of an example proximity coupler design.

FIG. 3B is a top view block diagram of an example proximity coupler design. The proximity coupler 300 shows the positive and negative polarity nodes 302, 304 of the differential pair that comprise an individual contactless pad 306. The dimensions of the contactless pad 306 may vary. Example contactless pads have had an area of 1 mm by 2 mm, and the capacitive coupling is initiated with a 0.5 mm separation between a receptacle and a plug head. In another example, the targeted geometry of a differential pair comprising a contactless pad 306 can be about 2 mm by 2.5 mm with the pads stacked 0.5 mm apart from one another vertically, or about 4.5 mm by 1 mm with the pads stacked 0.5 mm apart from one another horizontally. Because no physical contact is made between contactless pads, the signal coupling strength is related to the area of the contacts of the contactless pads and the distance of the separation between coupled contactless pads. In exemplary embodiments, there is an air gap of between 0.5 mm and 5 mm.

The area of a contactless pad 306 is the square of a side length that can range from at least 1 mm to 10 mm, and greater. An exemplary rate of data transfer for such a contactless pad 306 can be 10 gigabytes per second per contactless pad 306. Exemplary embodiments have utilized a coupler design 300 of an array of between 4 and 16 contactless pads 308, with data transfer rates of 20 to 40 Gb/s/contactless pad. Example coupler designs 300 can thus increase the rate of data transfer using capacitive coupling by increasing the effective area of a contactless pad, and/or increasing the number of contactless pads in the coupler design.

Figure 3C:
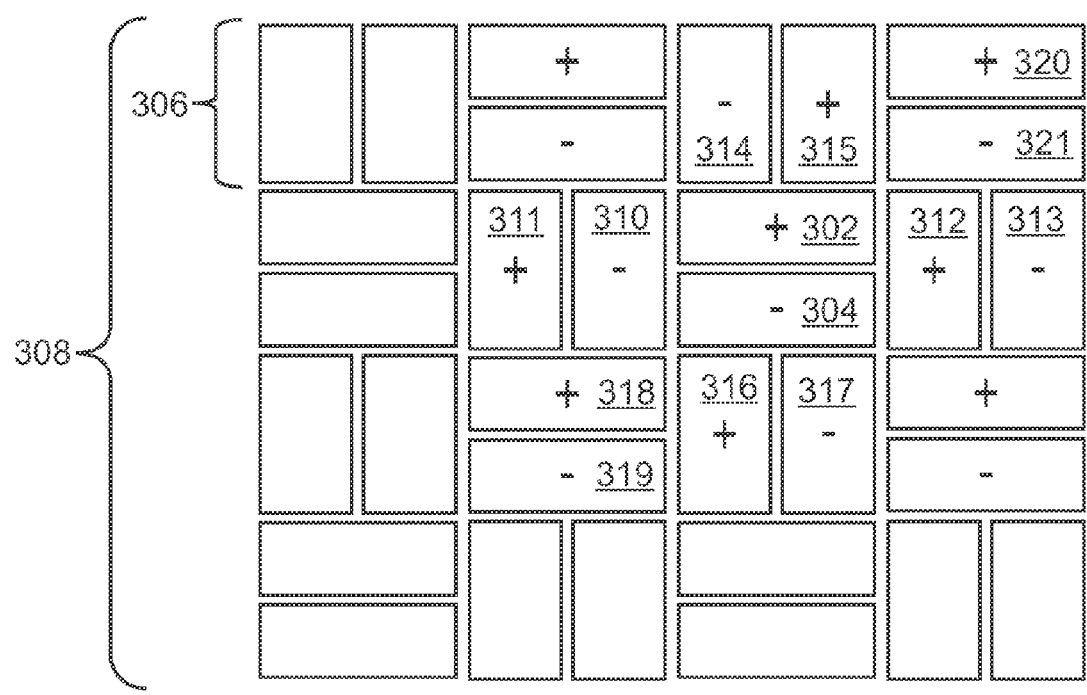
FIG. 3C illustrates how the symmetry and arrangement of differential pairs act to eliminate crosstalk and ringing from a high self-resonance frequency.

FIG. 3C illustrates how the symmetry and arrangement of differential pairs act to eliminate crosstalk and ringing from a high self-resonance frequency. Each differential pair includes a node of negative polarity and a node of positive polarity. Consider the left and right near neighbors of the differential pair 302 and 304. Specifically, to the left of the differential pair 302 and 304 is a differential pair 311 and 310. To the right of the differential pair 302 and 304 is a differential pair 312 and 313. The differential pair 311 and 310 and the differential pair 312 and 313 can be considered near neighbors of the differential pair 302 and 304.

The coupling from node 302 on the node 310 is equal and opposite of the coupling from node 304 on the node 310. Accordingly, there is no crosstalk on node 310 from the differential pair 302 and 304, as the coupling is equal and opposite, hence cancelled. Similarly, the coupling from node 302 on nodes 311, 312, and 313 is equal and opposite of the coupling from node 304 on the nodes 311, 312, and 313. As a result, any crosstalk on the differential pair 311 and 310 and the differential pair 312 and 313 is cancelled. Crosstalk therefore does not influence the couplings at blocks 310, 311, 312, and 313 because of the symmetry and orientation of the couplings, where alternating couplers and nodes are rotated 90 degrees. Thus, there is no crosstalk between neighboring differential pairs on the left and right to nodes 302 and 304.

The differential pair 314 and 315 and the differential pair 316 and 317 can also be considered near neighbors of the differential pair 302 and 304. However, the coupling from 304 to the node 316 and the node 317 is equal, but not opposite. This results in some crosstalk. Although there is crosstalk in the couplings it comes in the form of common mode crosstalk, which does not affect the differential signal transmitted or received. In fact, the differential signaling that is utilized and described by embodiments herein acts to cancel crosstalk on couplings with the top and bottom neighbors of 302 and 304 that would otherwise distort the transmission. Similarly, the coupling from 302 to the node 314 and the node 315 is equal, but not opposite. Yet, the resulting crosstalk is common mode and does not affect the differential signal transmitted or received by the differential pair 314 and 315.

The differential pair 318 and 319 and the differential pair 320 and 321 can be considered diagonal neighbors of the differential pair 302 and 304. The crosstalk from the residual coupling between these diagonal nodes is not fully canceled. However, the crosstalk is negligible as most of the electric field lines terminate in other near neighbor nodes, which are cancelled due to symmetry as described above. Crosstalk cancellation described herein allows the scalability of bandwidth based in part on the area of the signal pads and the number of parallel channels that are utilized. Thus, the configuration of the differential pairs illustrated by FIGS. 3A, 3B, and 3C makes the number of differential pairs or the number of contactless pads scalable. This in turn makes the number of channels scalable, which permits additional bandwidth to be transmitted using capacitive coupling at a very low power. The scalable configuration is due to the design of the proximity coupler 300 discussed herein, configured to transmit wide bandwidth and automatically eliminate significant crosstalk.

Although FIGS. 3A, 3B, and 3C illustrate a capacitive coupling system between a plug and a receptacle or between two flat surfaces inserted overtop one another, the techniques described herein may be implemented in various types of computing devices, which can act as a receptacle, can act as transmitting through a cable with a plug into a receptacle, and can act as both a receptacle and include a plug. Moreover, other types of components of a computing device may be incorporated and may benefit from the capacitively coupled plug and receptacle design described herein.

FIG. 4A is a perspective view of a contactless printed circuit board communication for a high-density interconnect. The communication 400 is achieved between a low density input/output (I/O) circuit board 402, for example a printed circuit board (PCB), and computing device module card 404, for example, which is another circuit board. In embodiments, a capacitive I/O is established on, for example, a high-density interconnect package on the I/O board 402. A capacitive I/O is also established on a high-density interconnect module card 404. The capacitive coupling between the two circuit board devices 402, 404 is made possible through use of contactless pads on a proximity coupler 300 designed in the same manner as described with respect to FIGS. 3A, 3B, and 3C.

In some embodiments, mechanisms may be used to increase the stability of the communication 400 between the circuit board devices 402, 404. For example, a magnet or system of magnets (not shown) can be used to align the capacitive coupling, and to retain the configuration of the two devices 402 and 404 in place. Although not shown, a similar alignment and retention mechanism can be implemented in FIGS. 1A and 1B. In another embodiment, an alternative to magnets are electromagnets (not shown) that can be used to align the coupling and retain the position of the two devices 402, 404. A latching mechanism (not shown) could also be used in an embodiment to ensure a proper alignment is made and retained between the opposite contactless pads in either device. This ensures that a capacitively coupled proximity transmission is enabled. The transmission will have a uniform signal strength because the alignment and retention mechanism can be configured to align the two devices to be coupled at a defined distance proximate to one another. The larger the distance of separation between the contactless pads on either device, or between the contactless pads on a plug and the contactless pads on a receptacle as in FIGS. 1A and 1B, then the larger the area of the contactless pads must be in order to maintain a desired received signal strength and a desired rate of data transfer at a particular power level.

FIG. 4B is another perspective view of a connector-less printed circuit board communication for a high-density interconnect. This view shows how the proximity coupler 300 from FIGS. 3A, 3B, and 3C is also present on the high-density interconnect PC module card 404. The module card 404 and the I/O board 402 incorporate capacitively coupled techniques of communication described herein using differential pairs. These devices 402, 404 transmit and receive information without contactless pads between proximity coupler 300 physically contacting one another. In an embodiment, a distance between the contactless pads on the two devices can be 1 mm in length. In other embodiments, the separation distance between a plug and receptacle, such as that illustrated in FIGS. 1A and 1B, can be fewer than 0.5 mm or greater than 1 mm in length.

Figure 4C:
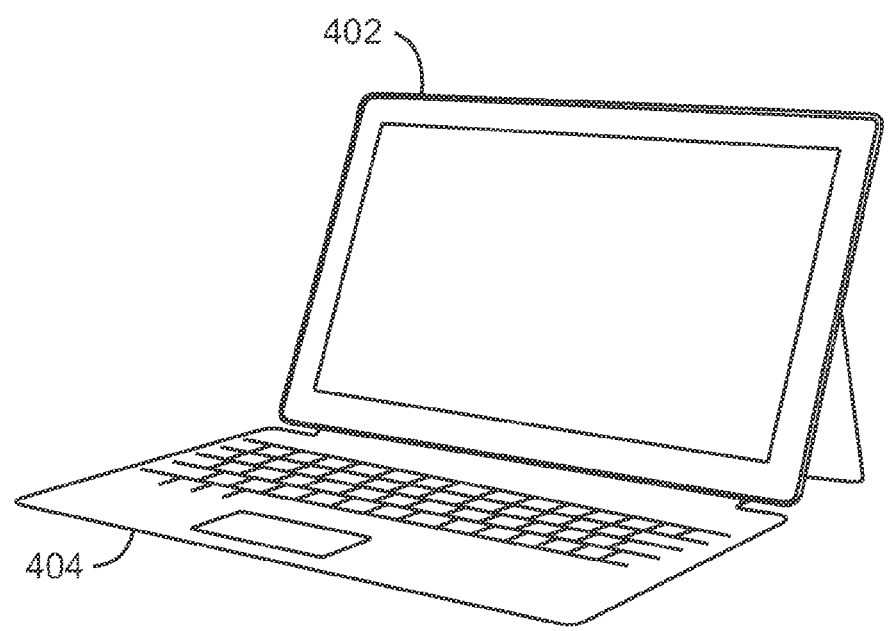
FIGS. 4C and 4D are perspective views of a flex-docking connection for high bandwidth transmission.

The example embodiment of FIGS. 4A, 4B and 4C benefits from the capacitively coupled I/Os described above in a few ways. First, a cost reduction can be realized because of the minimized production costs associated with assembling circuit boards, since the pins that are typically used in connections are no longer used. There are no pins in the capacitively coupled example described above, and the PCB is moreover more economical to fabricate. As a result of not using bandwidth-limiting pins in the design, the coupling based on capacity that does not rely on pins can potentially achieve higher bandwidths, and at lower costs of production.

Figure 4D:
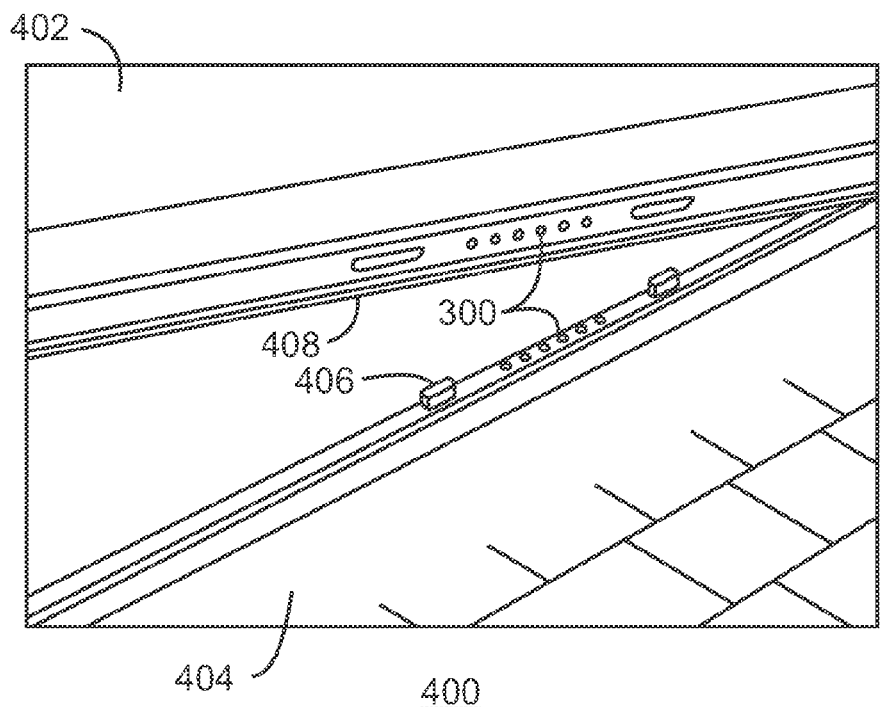

FIGS. 4C and 4D illustrate a perspective view of a flex-docking connection for high bandwidth transmission. The computing devices shown include a display device 402 and a keyboard device 404, which communicate with one another in the same manner as described herein with respect to circuit board devices 402 and 404. A capacitive proximity coupler 300 as described with respect to FIGS. 3A, 3B, and 3C is used to communicatively connect the display device 402 and the keyboard device 404. Plastic hinges 406 protruding from keyboard device 404 can be used to slide inside the display device 402. By inserting the hinges 406 on the keyboard device 404 into insert holes 408 of the display device 402, a flexible docking can be achieved with high contact between the hinges 406 and insert holes 408. A contactless capacitive coupling is achieved between the pads of the proximity coupler 300 on the front surface of the keyboard device 404 and the coupler 300 on the inside surface of the display device 402, thereby allowing for low-power, high-bandwidth transmissions. Also, both the hinge on 404 and the hole in 402 can be long and 300 could be placed vertically on one outer surface of the hinge and another inner surface of the hole.

Figure 5:
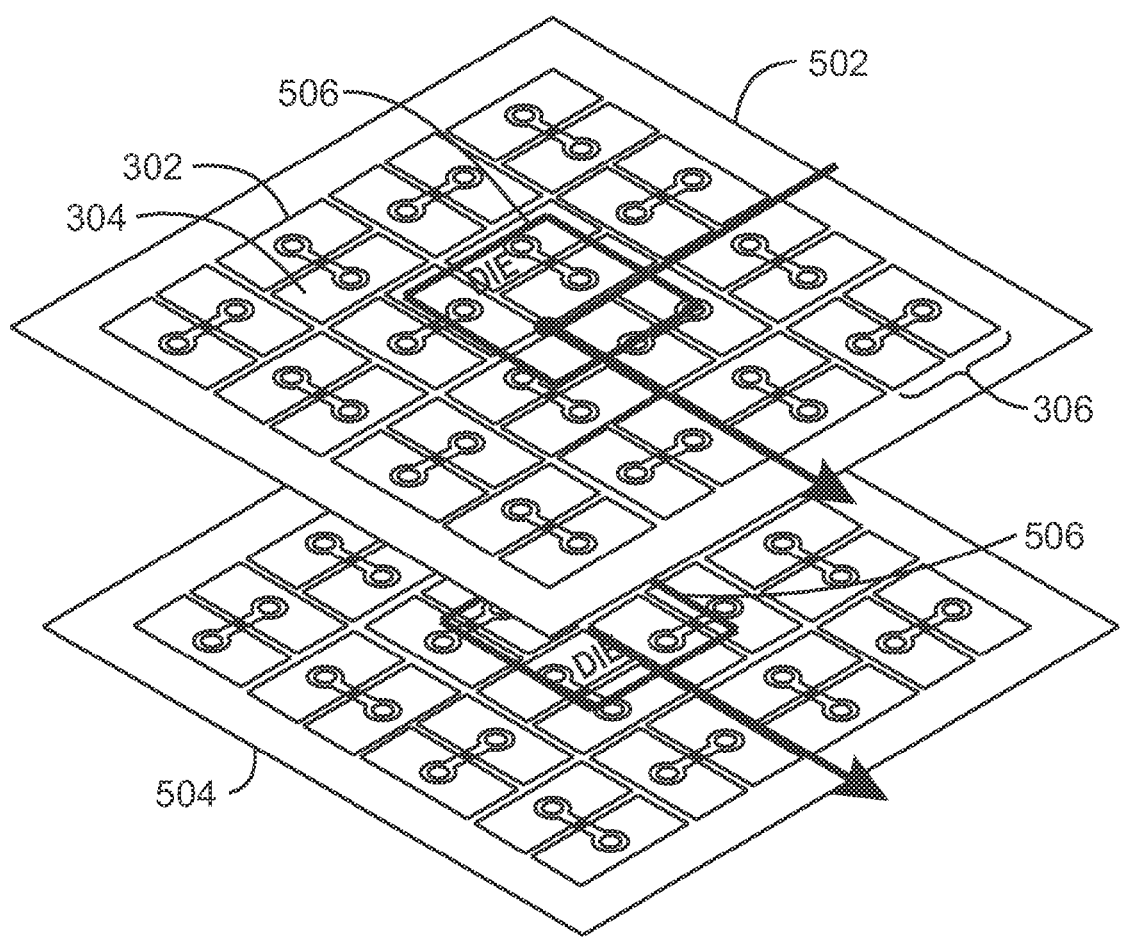
FIG. 5 is a diagram illustrating an active silicon buffer or die on an example capacitive coupler.

FIG. 5 is a diagram illustrating an active silicon buffer or die on an example capacitive coupling 500. The coupling 500 can be described the same as the proximity coupler 300 with respect to FIGS. 3A, 3B, and 3C. An upper coupler 502 and a lower coupler 504 of the capacitive coupling 500 each incorporate an active silicon die 506. The active silicon die 506 acts as a buffer to filter and integrate the signal as it is sent and received between each coupler 502, 504. In an exemplary embodiment, an active silicon die 506 is found on the top of the upper coupler 502, and an active silicon die 506 is found at the bottom of the bottom coupler 504. Without an active silicon die 506 acting as a buffer, there would be excessive ringing in the signal as a result of the high self-resonance frequency that is exhibited for capacitive coupling with the bandwidth used, and at the distances and power levels described herein.

Figure 6A:
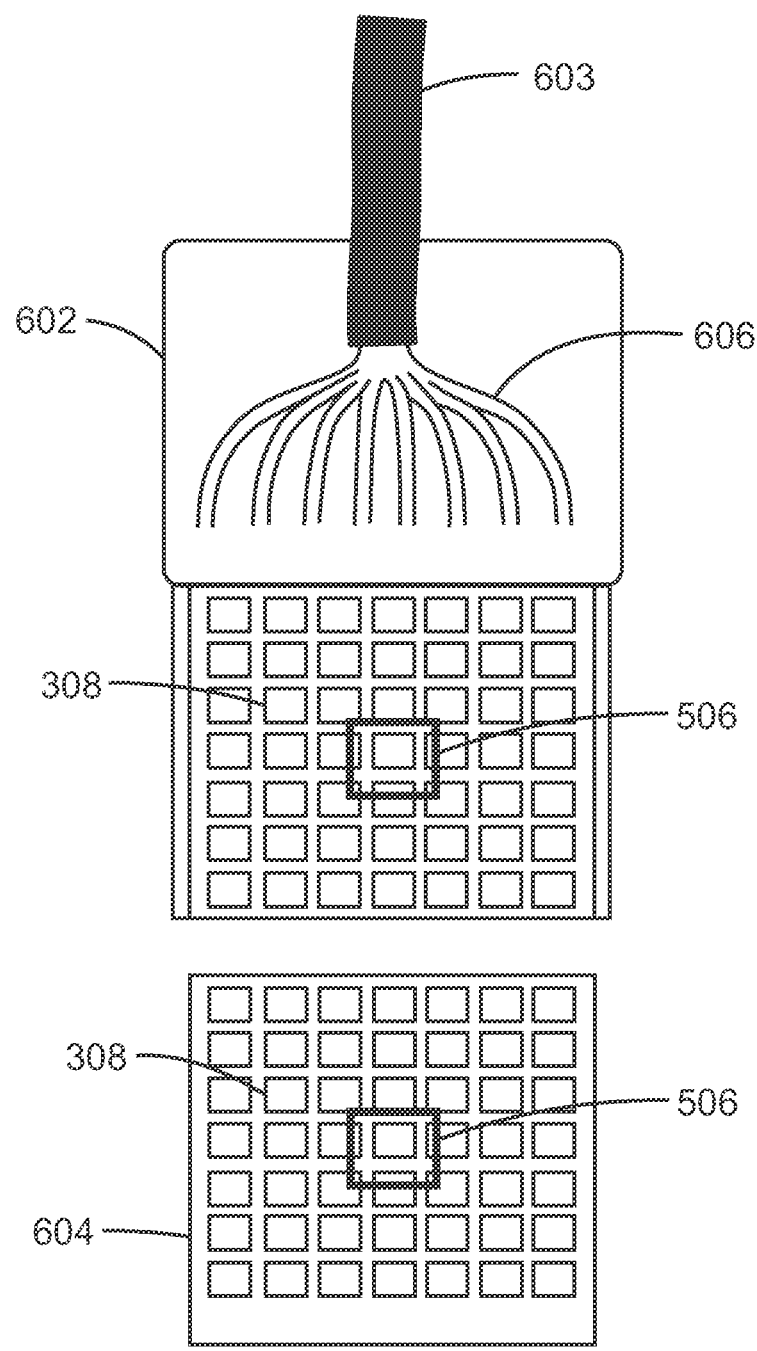
FIG. 6A is a schematic diagram illustrating a high bandwidth proximity connector between a plug having an insertion depth into a receptacle.

FIG. 6A is a diagram illustrating a high bandwidth proximity connector between a plug having an insertion depth into a receptacle. The plug 602 has a cable 603 connected to it and that is connected to traces 606 in the plug 602. The traces 606 can be connected to an active silicon die 506, and the traces 606 can be connected to contactless pads included in the array of contactless pads 308, as described with respect to FIGS. 3A and 3B. An array of contactless pads 308 is on both the plug 602 and the receptacle 604, and when the plug 602 and receptacle 604 are mated, the contactless pads are configured to send and receive high bandwidth proximity transmissions. The active silicon die 506 acts as a filtering and integration tool, providing low-power signal processing that is efficient when a data transfer rate is returning a high self-resonance frequency, and thus when significant ringing in the signal must be reduced to ensure efficient transmission.

Figure 6B:
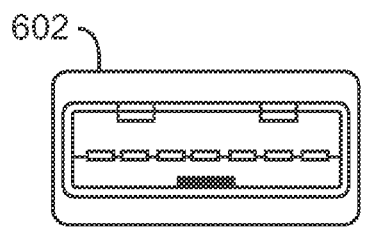
FIG. 6B is a schematic illustrating a front view of an example plug head from FIG. 5A that is configured to be inserted into a receptacle.

FIG. 6B is a schematic illustrating a front view of an example plug head from FIG. 6A that is configured to be inserted into a receptacle. An increased number of contactless pads around the plug 602 are configured to send and receive positive and negative polarity signals to and from counterpart contactless pads located on a receptacle (not shown).

Figure 6C:
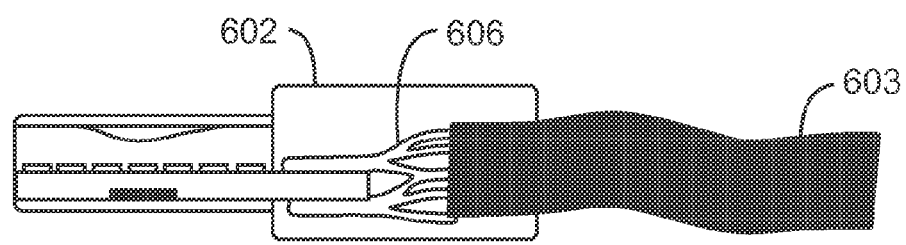
FIG. 6C is a side view of an example plug head from FIG. 5A that is configured to be inserted into a receptacle.

FIG. 6C is a side view of an example plug head from FIG. 6A that is configured to be inserted into a receptacle. It illustrates the traces 606 and how the cable 603 spreads, for example, through PCB lines or other electrical circuits, and is configured to make an electrical connection with each contactless pad (not shown).

Figure 6D:
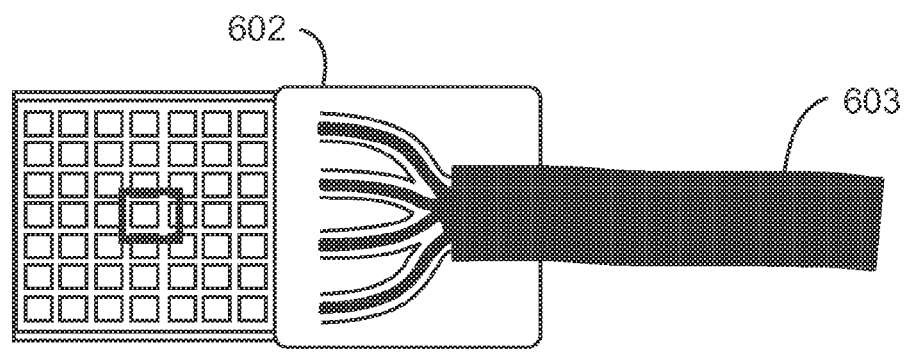
FIG. 6D is a view of an example plug head with an array of contactless pads that has a generally larger area and is configured to be inserted into a receptacle.

FIG. 6D is a view of an example plug head with an array of contactless pads that has a generally larger area and is configured to be inserted into a receptacle. This plug 602 is configured to be inserted into a receptacle (not shown) at some insertion depth of greater than zero. In other words, plug 602, which has an additional number of contactless pads (a larger array is used on the plug) in order to accommodate larger bandwidth, inserts into the receptacle. An array of contactless pads 308 surrounding the top of the plug 602 and the bottom of the receptacle (as well as the front of the plug and front of the receptacle) is utilized in order to achieve more efficient receptacle-to-plug mating and capacitive coupling.6 Traces 606 are shown originating from the cable 603 to achieve higher bandwidth transmission and to implement additional contactless pads to achieve capacitive coupling.

Although FIGS. 6A, 6B, 6C, and 6D generally illustrate a system to capacitively couple a plug and a receptacle, the techniques described herein may be implemented in various types of computing devices, which can act as a receptacle, can act as transmitting through a plug into a receptacle, and can act as a receptacle and include a plug. Moreover, other types, sizes, and configurations of components of a computing device may be incorporated and may benefit from the capacitively coupled plug and receptacle design described herein. For example, a laptop device can be capacitively coupled using the techniques described herein to a docking station. As another example, another computing device, such as a phone, could be coupled using the techniques described herein to a laptop device, or to a charging mat, thus enabling wireless communication or wireless charging, respectfully, through capacitively coupled proximity transmissions.

Figure 7A:
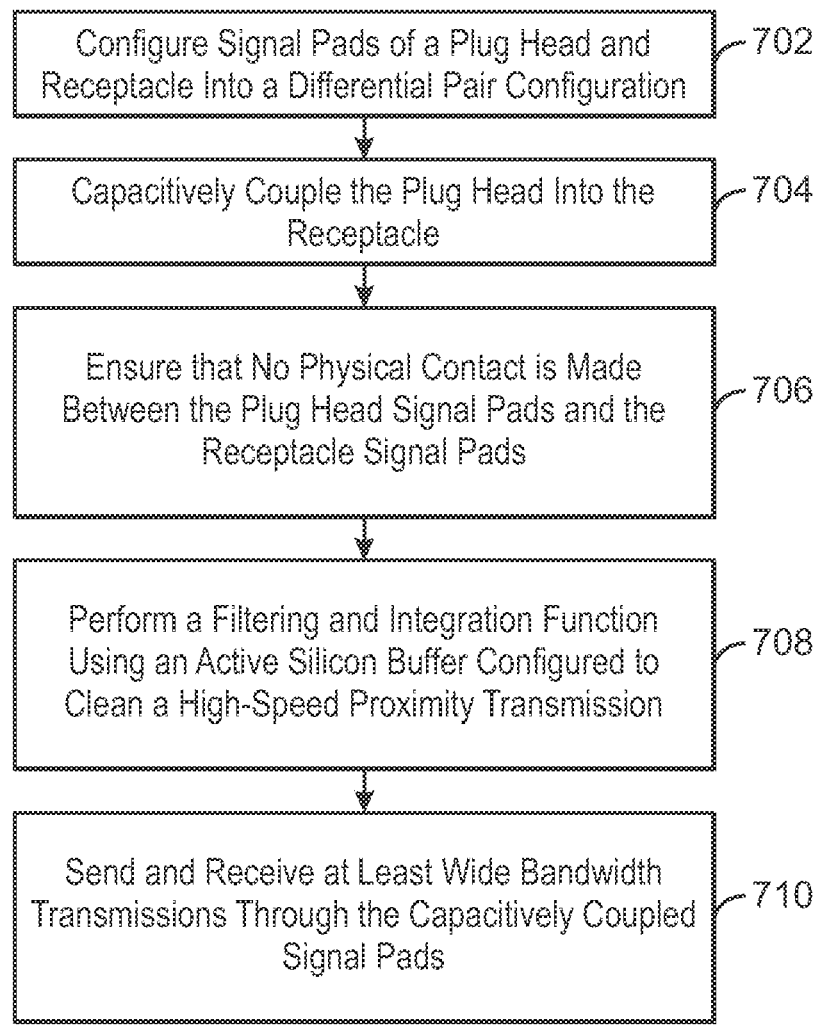
FIG. 7A is a flowchart illustrating a method to achieve high-bandwidth capacitive coupling.

FIG. 7A is a flowchart illustrating a method to achieve high-bandwidth capacitive coupling. The method 700 begins at block 702 by configuring the contactless pads of a plug head and a receptacle into a differential pair configuration. This type of configuration has been discussed above, and is used in embodiments because of the ability to transmit data at high frequency and to extract the correct bandwidth at very low power, e.g., less than about 5 pJ/bit. At block 704, a plug head of a cable or a computing device is capacitively coupled to a receptacle. The receptacle could be another computing device, could be power source, could incorporate both a computing device and a power source, or could be some other device compatible with capacitive coupling.

At block 706, it is ensured that no physical contact is made between contactless pads in the plug head and contactless pads in the receptacle that are configured to transmit and receive data to and from one another. An alignment and retention mechanism is used in some embodiments to ensure that a coupling is made without any contact between the pads, and is maintained. Such mechanisms to stabilize the connection include use of magnets, and use of a simple latching mechanism to maintain a separation distance. Another mechanism, not described herein, to hold the plug in place at a certain height and distance from the receptacle, while ensuring high-bandwidth transmission is enabled, could be acceptably implemented. A compact, aligned connector design can result from implementing method 700.

When a communication channel is defined in a system that is capacitively coupled, and when bandwidth is sufficiently high, a self-resonance frequency will introduce significant ringing at a transmitter. As the size of contactless pad arrays increase to achieve larger separation distance and more channels, the self-resonance frequency, which can hamper the received signal, intensifies and must be sufficiently filtered. The need to be able to extract the correct bandwidth at very low power levels can be satisfied in part, for example, by an active silicon buffer. The active silicon buffer is configured to filter the ringing in the signal before the signal is sent to a receiver, which is part of the same active silicon buffer.

At block 708, a filtering and integration function is performed using an active silicon buffer. The active silicon buffer is configured to clean or polish the noise from a high-speed proximity transmission between the contactless pads of a plug and the contactless pads of a receptacle. The silicon buffer is important to ensuring that the correct bandwidth is being extracted during communications. To enable wide bandwidth transmissions, the use of a silicon buffer or similar component for filtering and integration is needed. The active silicon buffer can be placed on top of the coupler and act as an intermediate between the coupler that sends the transmission. The buffer processes the signal to the coupler before being sent out to any connected devices. In embodiments discussed herein, the silicon buffer can be located on the bottom side of the plug and the topside of a receptacle, as the plug and receptacle are mated. These active silicon buffers, or "buffer chips", serve as a proximity transmitter and receiver configured to properly transmit and receive the high-speed signals generated between contactless pads.

At block 710, a wide bandwidth transmission is configured to be sent and received through contactless pads that are capacitively coupled. Configurations of embodiments discussed herein can support 40 Gb/s in each direction. In other words, 40 Gb/s can be achieved in the transmit direction through transmit lanes, and 40 Gb/s can be achieved in the receive direction through receive lanes. For a targeted geometry of each signal pair of a differential pair at 4.5 mm×1 mm or 2.5 mm×2 mm (i.e., the dimensions of one node of the differential pair is 1 mm×2 mm), up to 20 Gb/s data rates per differential pair can be achieved. Thickness of the differential pair is typically around 50 µm. The method 400 is useful in transmitting data at high transfer rates between computing devices. This method will virtually eliminate wear and problems associated currently with, for example, uniform serial bus (USB) connectors and other physical electrical connectors that experience significant wear due to contact and repeated insertion and removal of plug heads to a receptacle.

Figure 7B:
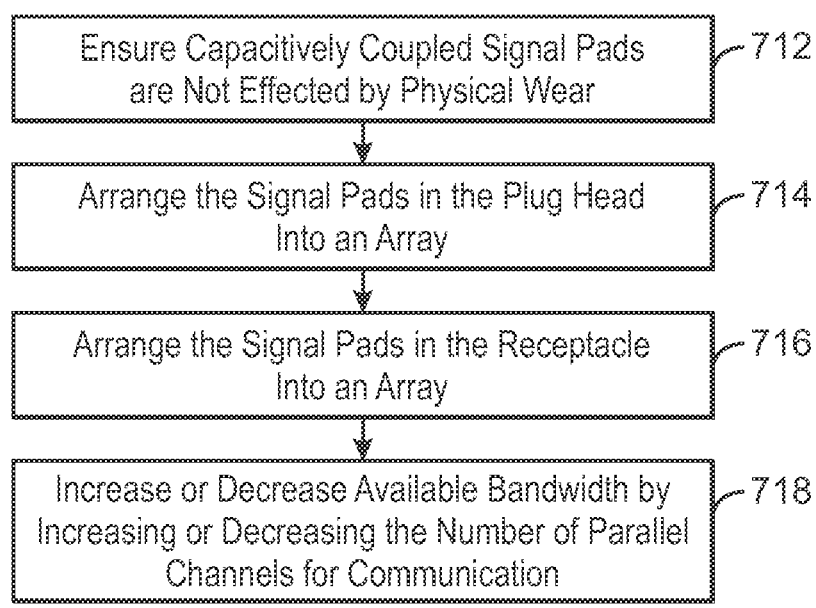
FIG. 7B is a flowchart illustrating additional processes of a method 700 to achieve high-bandwidth capacitive coupling.

FIG. 7B is a flowchart illustrating additional processes of a method 700 to achieve high-bandwidth capacitive coupling. The additional step at block 712 indicates that the method 700 ensures the contactless pads, which together comprise a capacitive coupler, do not exhibit negative effects in the connection associated with physical wear. The high-speed proximity coupler allows for wide bandwidth transmission while eliminating friction between the signal pads (contactless pads), thus negating wear due to excessive touching between the plug and receptacle.

At block 714, the method 700 continues with the additional step of arranging the signal pads in the plug head in an array. At block 716, the signal pads in the receptacle are also arranged in an array configuration. The arrays of signal pads on the plug head and the receptacle are configured to enable crosstalk cancellation between differential pairs and all neighbors of a particular differential pair. The cancellation of crosstalk is discussed in more detail with respect to FIG. 3C above. At block 718, the available bandwidth can be increased or decreased as the number of parallel channels increase or decrease. An increase in the area of an array of signal pads will increase the number of parallel channels available for communication. In this way the capacitive coupler described herein is easily scalable. A high-speed proximity transmission between two computer devices is made possible by method 700 and the techniques described herein.

Figure 8:
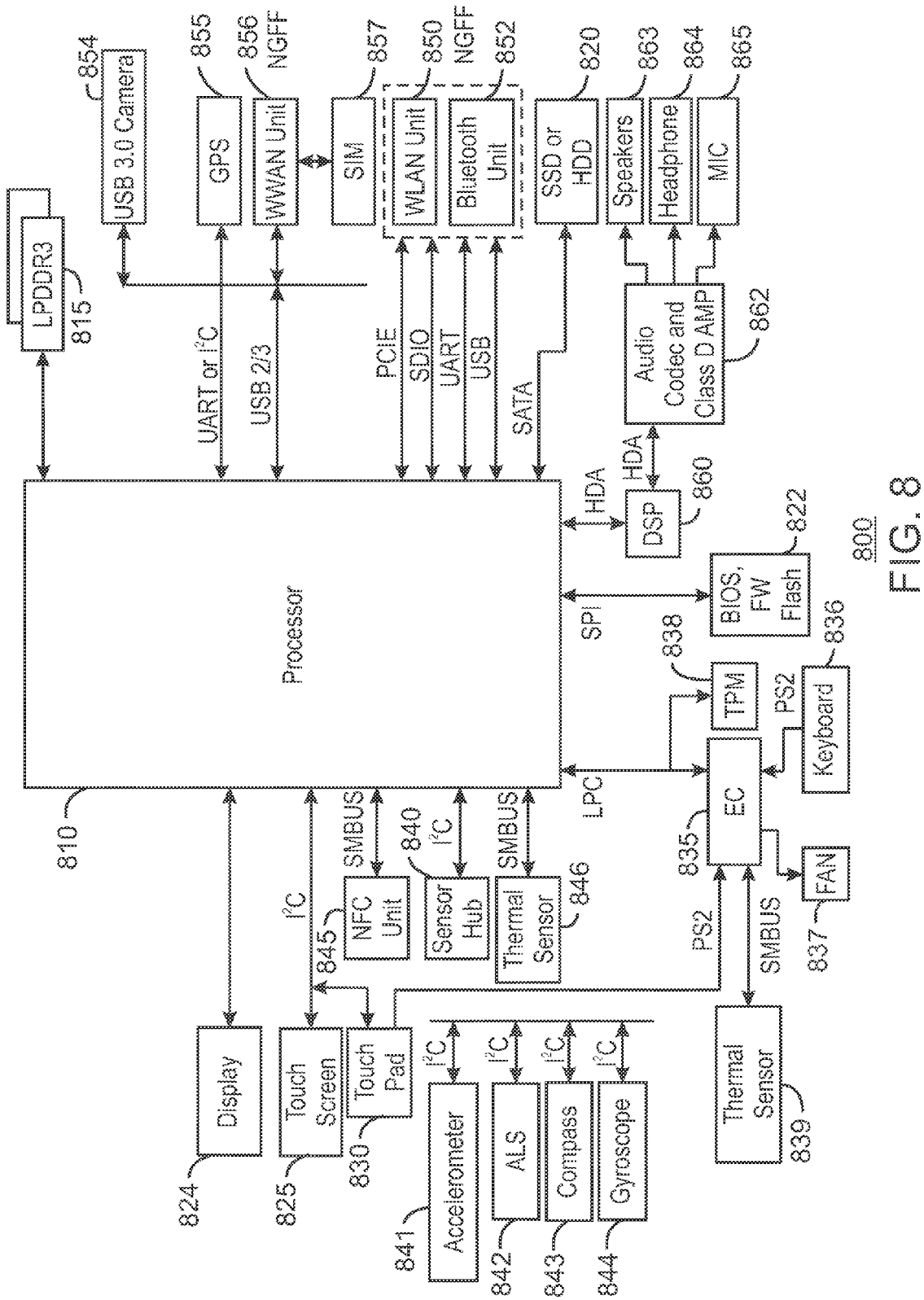
FIG. 8 is a block diagram of components present in a computer system in accordance with an embodiment of the present techniques.

FIG. 8 is a block diagram of components present in a computer system 800 in accordance with an embodiment of the present techniques. As shown in FIG. 8, system 800 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high level view of many components of the computer system. However, it is to be understood that some of the components shown may be omitted, additional components may be present, and different arrangement of the components shown may occur in other implementations. As a result, the present techniques described above may be implemented in any portion of one or more of the interconnects illustrated or described below.

As seen in FIG. 8, a processor 810, in one embodiment, includes a microprocessor, multi-core processor, multi-threaded processor, an ultra low voltage processor, an embedded processor, or other known processing element. In the illustrated implementation, processor 810 acts as a main processing unit and central hub for communication with many of the various components of the system 800. As one example, processor 800 is implemented as a system on a chip (SoC). As a specific illustrative example, processor 810 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an $I^2C$ interconnect. As further shown in FIG. 8, in addition to touch screen 825, user input by way of touch can also occur via a touch pad 830 which may be configured within the chassis and may also be coupled to the same $I^2C$ interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I$^2$C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

In some embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 8, various peripheral devices may couple to processor 810 via a low pin count (LPC) connector. LPC connectors are connectors according to the present techniques. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand that the scope of the present techniques is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present techniques is not limited in this regard.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

EXAMPLE 1

A system for high-bandwidth data transmission including a plug head including a contactless pad. The system includes a receptacle including a contactless pad. The system includes a capacitive coupling between the plug head and the receptacle. The contactless pads are contactless and in close proximity to one another to enable capacitive, high bandwidth data transmission.

EXAMPLE 2

A proximity connector for high speed connections, including a plug head and a receptacle. The receptacle is to form a capacitive coupling with the plug head, wherein contactless pads of the plug head are to capacitively couple to contactless pads of the receptacle, wherein the contactless pads each include a differential pair configuration, and wherein the contactless pads are arranged in an array configured to enable crosstalk cancellation for near neighbors

EXAMPLE 3

A method for forming a high bandwidth proximity connector, including forming a plug head with a plurality of contactless pads, wherein wires of a cable are coupled with the plurality of contactless pads. The method includes forming a receptacle with a plurality of contactless pads, wherein wires of a cable are coupled with the plurality of contactless pads. The method includes fitting an active buffer material on a surface of the plug head and on a surface of the receptacle, wherein the active buffer material is configured to filter noise from a high-speed proximity transmission between the contactless pads on the plug head and the contactless pads on the receptacle While the present techniques has been described with respect to a limited number of embodiments, those skilled in the art will appreciate numerous modifications and variations therefrom. It is intended that the appended claims cover all such modifications and variations as fall within the true spirit and scope of this present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system for high-bandwidth data transmission, comprising:
   a plug head including a contactless pad;
   a receptacle including a contactless pad; and
   a capacitive coupling between the plug head and the receptacle, and wherein the contactless pads are contactless and in close proximity to one another to enable capacitive, high bandwidth data transmission, wherein the contactless pads are arranged in an array comprising a 90-degree offset geometry to enable crosstalk cancellation for near neighbors.

2. The system of claim 1, wherein an array of contactless pads on the plug head and an array of contactless pads on the receptacle are configured to eliminate crosstalk in the capacitive coupling, and support a high bandwidth proximity transmission.

3. The system of claim 1, wherein a contactless pad includes a differential pair configuration.

4. The system of claim 1, further comprising an active silicon die configured to enable the high bandwidth proximity transmission between the plug head and the receptacle.

5. The system of claim 4, wherein the active silicon die acts as a buffer and achieves a filtering and integration function that suppresses ringing effects from a self-resonance frequency.

6. The system of claim 2, wherein the plug head has an insertion depth into the receptacle of zero.

7. The system of claim 2, wherein the plug head has an insertion depth into the receptacle of greater than zero.

8. The system of claim 1, wherein there is no physical wear to either the first contactless pad or the second contactless pad due to mating between the plug head and the receptacle.

9. The system of claim 1, wherein an alignment is made and maintained between the plug head and the receptacle by an alignment and retention mechanism.

10. The system of claim 9, wherein the alignment by the alignment and retention mechanism is retained through magnets, or a latching mechanism.

11. The system of claim 1, further comprising a physical coupling between a pin of a power contact and a pin of a ground contact.

12. A proximity connector for high speed connections, comprising:
 a plug head; and
 a receptacle, wherein the receptacle is to form a capacitive coupling with the plug head, wherein contactless pads of the plug head are to capacitively couple to contactless pads of the receptacle, wherein the contactless pads each include a differential pair configuration, and wherein the contactless pads are arranged in an array comprising a 90-degree offset geometry to enable crosstalk cancellation for near neighbors in the array.

13. The proximity connector of claim 12, wherein high bandwidth data transmission between the contactless pads of the plug head and the contactless pads of the receptacle is enhanced by an active silicon die fixed to the plug head and fixed to the receptacle.

14. A method for forming a high bandwidth proximity connector, comprising:
 forming a plug head with a plurality of contactless pads, wherein wires of a cable are coupled with the plurality of contactless pads;
 forming a receptacle with a plurality of contactless pads, wherein wires of a cable are coupled with the plurality of contactless pads; and
 fitting an active buffer material on a surface of the plug head and on a surface of the receptacle, wherein the active buffer material is configured to filter noise from a high-speed proximity transmission between the contactless pads on the plug head and the contactless pads on the receptacle.

15. The method of claim 14, wherein the high-speed proximity transmission between the contactless pads on the plug head and the contactless pads on the receptacle is achieved through a capacitive coupling.

16. The method of claim 14, further comprising arranging the plurality of contactless pads in the plug head in an array, and arranging the plurality of contactless pads in the receptacle in an array, wherein the arrays are configured to enable crosstalk cancellation for between differential pairs and all neighbors.

17. The method of claim 14, wherein the plurality of contactless pads in the plug and in the receptacle are capacitively coupled, and configured to send and receive the high-speed proximity transmission.

18. The method of claim 14, further comprising making a connection between the plug head and the receptacle, wherein the plug head and the receptacle are held at an insertion depth of zero by an alignment and retention mechanism.

19. The method of claim 14, further comprising making a connection between the plug head and the receptacle, wherein the plug head and the receptacle are held at an insertion depth of greater than zero by an alignment and retention mechanism.

20. The method of claim 14, wherein the active buffer material comprises active silicon.

* * * * *